THOMAS C. LEIGHTON
AUGUST NUUT
INVENTORS

BY Forest J. Lilley

ATTORNEY

THOMAS C. LEIGHTON
AUGUST NUUT
*INVENTORS*
BY [signature]
ATTORNEY

THOMAS C. LEIGHTON
AUGUST NUUT
INVENTORS

BY Forest J. Lilly

ATTORNEY

STEREOPLOTTER

Filed June 21, 1955 12 Sheets-Sheet 4

THOMAS C. LEIGHTON
AUGUST NUUT
INVENTORS

BY [signature]

ATTORNEY

STEREOPLOTTER

Filed June 21, 1955 12 Sheets-Sheet 5

THOMAS C. LEIGHTON
AUGUST NUUT
INVENTORS
BY [signature]
ATTORNEY

THOMAS C. LEIGHTON
AUGUST NUUT
INVENTORS

BY [signature]
ATTORNEY

THOMAS C. LEIGHTON
AUGUST NUUT
INVENTORS
BY [signature]
ATTORNEY

THOMAS C. LEIGHTON
AUGUST NUUT
INVENTORS
BY [signature]
ATTORNEY

X-Y TRAVERSING SERVOS AND CONTOUR COMPLETION MEMORY CIRCUITS

THOMAS C. LEIGHTON
AUGUST NUUT
*INVENTORS*

BY [signature]
ATTORNEY

THOMAS C. LEIGHTON
AUGUST NUUT
INVENTORS
BY [signature]
ATTORNEY

WAVEFORMS: SIGNAL SEPARATION PROCESS

FUNCTIONAL BLOCK DIAGRAM OF SIGNAL SEPARATOR

THOMAS C. LEIGHTON
AUGUST NUUT
*INVENTORS*

BY [signature]

ATTORNEY

THOMAS C. LEIGHTON
AUGUST NUUT
INVENTORS
BY Forrest J. Lilly
ATTORNEY

United States Patent Office 3,004,464 Patented Oct. 17, 1961

3,004,464

STEREOPLOTTER

Thomas C. Leighton, Pasadena, and August Nuut, Glendale, Calif., assignors to Hycon Mfg. Company, Pasadena, Calif., a corporation of Delaware Filed June 21, 1955, Ser. No. 516,846
9 Claims. (Cl. 88—14)

This invention relates generally to stereoplotting devices and more particularly to an automatic stereoplotter.

An aircraft flying over terrain can make stereo photographs of the terrain by photographing different sections of the terrain to produce two stereo photographs of each section. This can be accomplished, for example, by taking a photograph of a section of terrain at one point along an established flight path and another photograph including the same section at another, later, point along the flight path.

A stereo model of a section of terrain can be reproduced over a plane surface by projecting onto the surface, the image of the section of terrain from each of two stereo diapositives with suitable projectors properly positioned and oriented. It is possible to plot contour lines, for example, on the plane surface from the stereo model by providing a horizontally as well as vertically adjustable platen, which may be a small disc with a center dot (called the wander mark) thereon, and a plotting pen or pencil. The platen can be positioned anywhere over the surface, the vertical height of the platen being a measure of elevation of the terrain at any point when the two images, or image portions, are in register at the platen. Thus, if the vertical height of the platen is held fixed at different levels, contour lines can be drawn on the plane surface below by the pen or pencil when the platen is moved about horizontally for each level while keeping the image portions on the platen in register at the wander mark. The wander mark is aligned with the pen or pencil. This process of plotting contour lines is conventionally done manually and generally requires several hours to plot the contour lines from a single pair of photographs.

Each stereo picture may be regarded as a communication channel or a carrier of information. Useful information, for example information which would lead to a determination of elevation of terrain from stereo photos, is implicit in the relative displacement of the same object in both photos parallel to the line of parallax displacement. Thus, it is necessary to simulate or duplicate the visual perception of a human operator which permits him to identify and locate the same object in two individual photos. Next, it is necessary to measure the relative parallax displacement to determine the elevation, for example, of the object or point in question.

When each picture is converted from space domain to an equivalent time domain by suitable photoelectric scanning, the equivalent electronic problem of identifying and locating an object in two similar space domains becomes one of correlating two electric messages which are functions of time.

The application of the correlation function (terms as defined later below)

$$\phi_{12}(t') = \lim_{T\to\infty} \frac{1}{2T}\int_{-T}^{+T} f_1(t) f_2(t+t')\,dt$$

is ideal for the problem of time matching of similar data, but leads to another problem created by the nature of the stereo photos; i.e., the shape of an object is different in each of the two photos. A consideration of the relative distortion of the same object surface in two properly projected stereo photos reveals that the images are only relatively skewed, foreshortened, or both, as a function of orientation and degree of tilt of the surface in which it is located. Dimensions normal to the line of parallax displacement are equal. If the scanning of the image from one stereo photo is distorted in an appropriate fashion relative to the other, the two electronic signals can be made identical except for random noise. The correlation function $\phi_{12}(t')$ provides the necessary information about image matching and noise rejection. The correlating means should therefore be utilized in an optimum manner.

It is an object of the present invention to provide an automatic elevation measuring device for use with stereo photographs.

Another object of the invention is to provide means for identifying a point on the surface of a stereo model by correlating data from a line in each stereo photograph containing the point, or by correlating data from an area about the point in each stereo photograph.

A further object of this invention is to provide a device in which spatial coordinate data concerning the location of a point relative to reference coordinates is produced.

A still further object of the invention is to provide a stereoplotter wherein control of recording and mapping functions is dependent upon the accuracy with which a point is identified.

Briefly, the foregoing and other objects are accomplished by providing means for forming a stereo model over a plane surface from a set of stereo diapositives, means for converting each stereo picture carrier of information from a space domain to an equivalent time domain by a photoelectric scanning process, means for identifying and locating an object in two similar space domains by correlating two electric messages which are functions of time, and means for plotting the correlated information according to the accuracy of identification.

This invention possesses other objects and features, some of which, together with the foregoing, will be set forth in the following description of a preferred embodiment of the invention, and the invention will be more fully understood by reading the description with joint reference to the accompanying drawings, in which.

Figure 15:
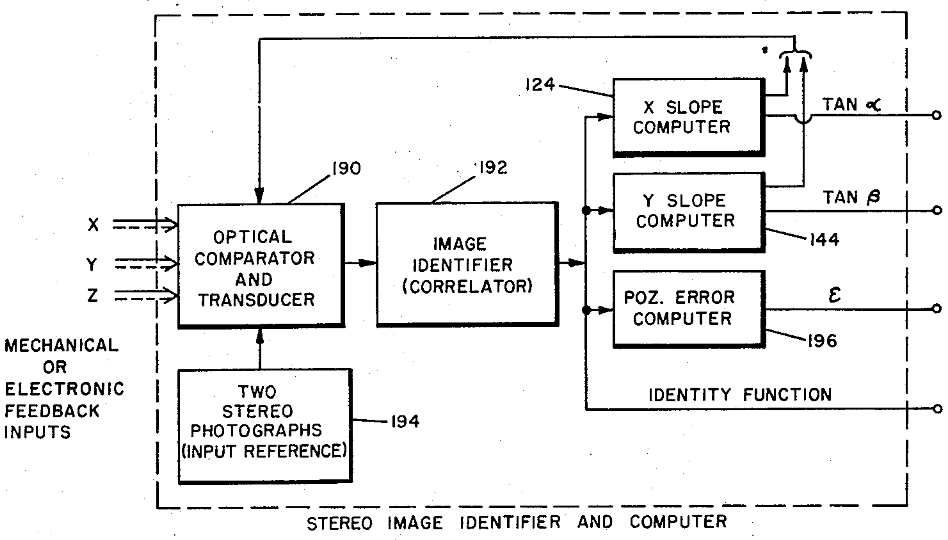
Figure 5A:
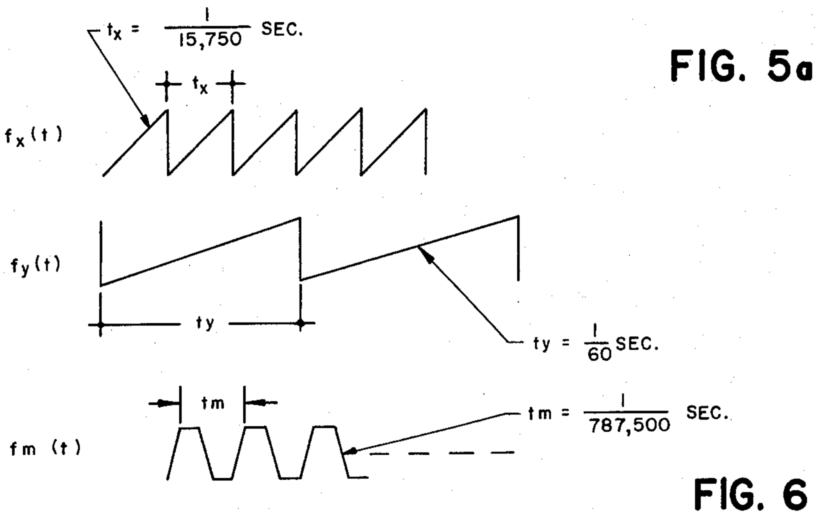
FIGURE 5 is a block diagram generally depicting the scanning and correlation process.
Figure 6:
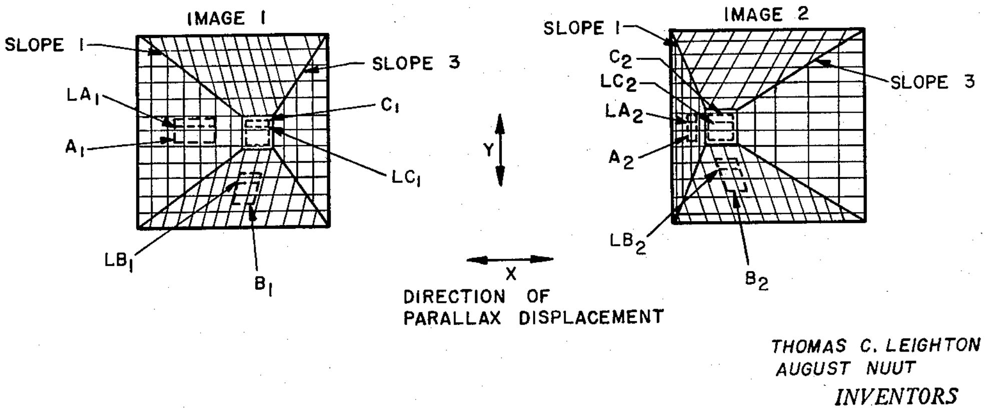
Figure 11:
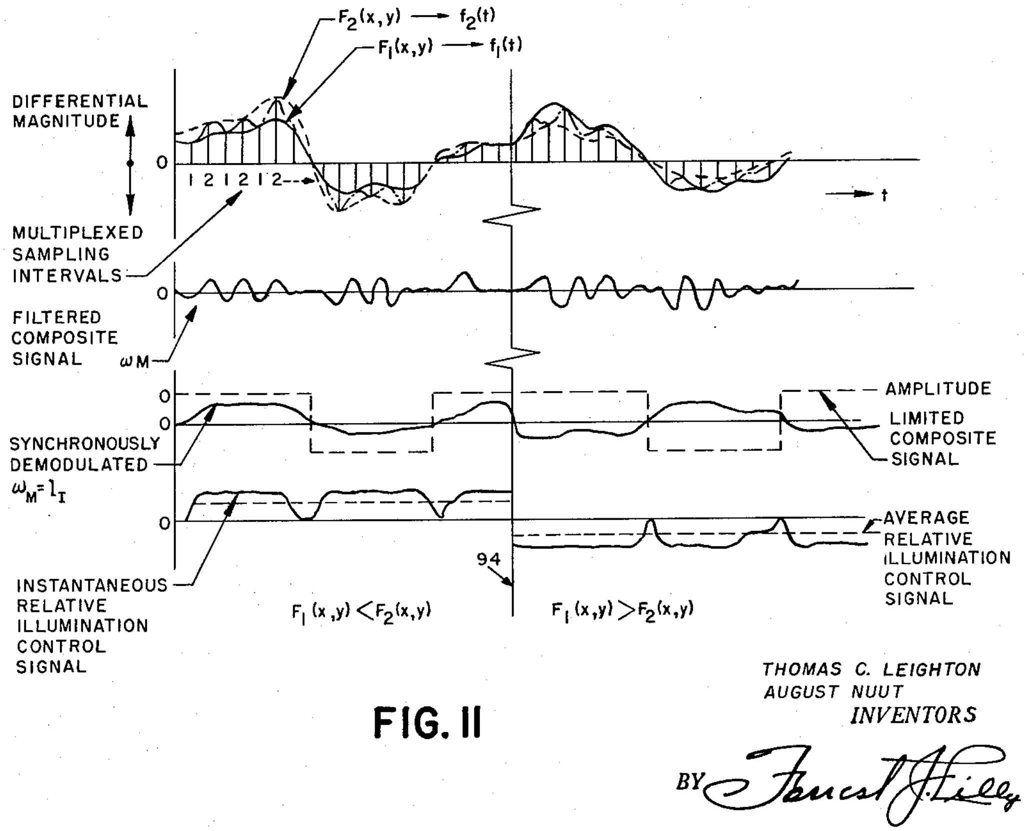
Figure 6A:
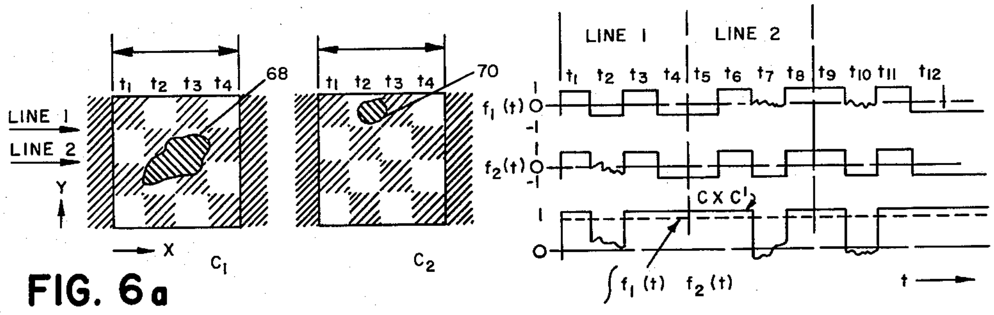
Figure 6B:
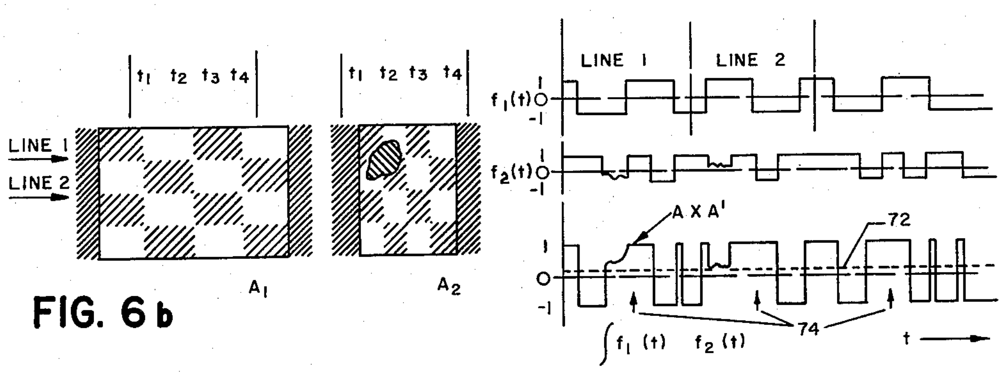
Figure 6C:
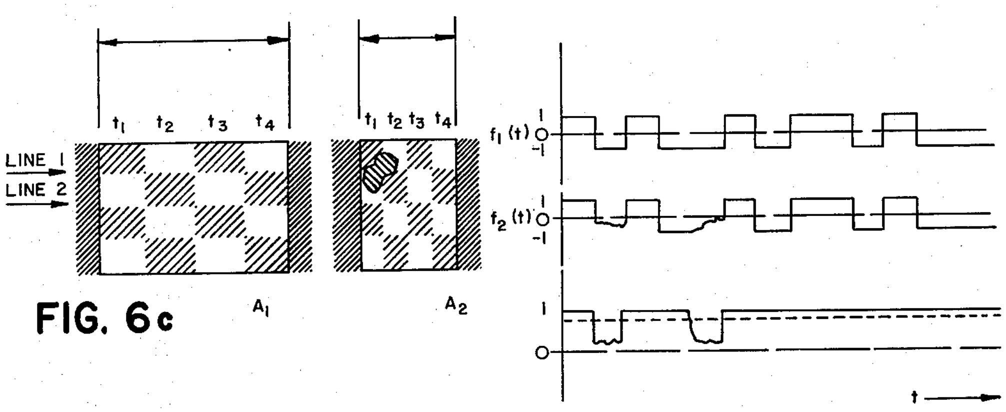
Figure 7A:
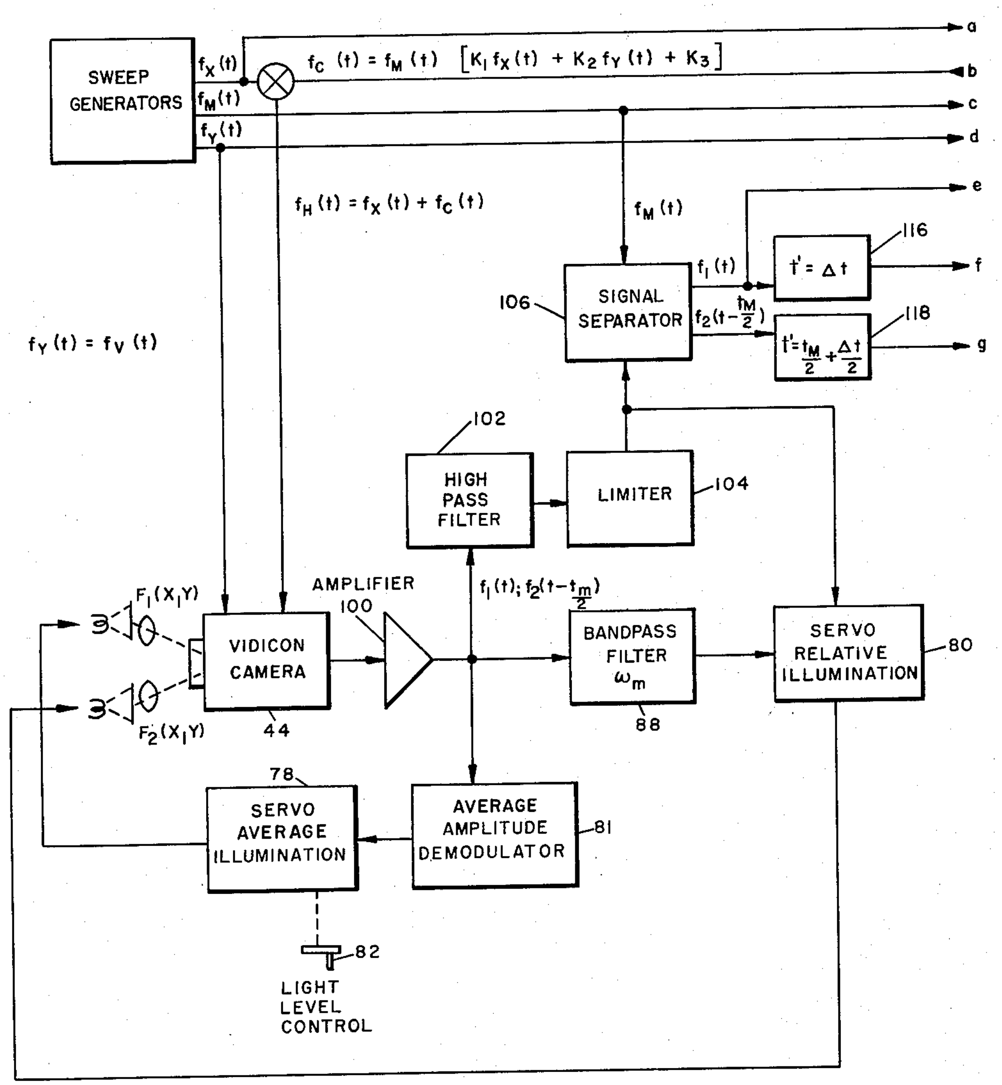
Figure 7B:
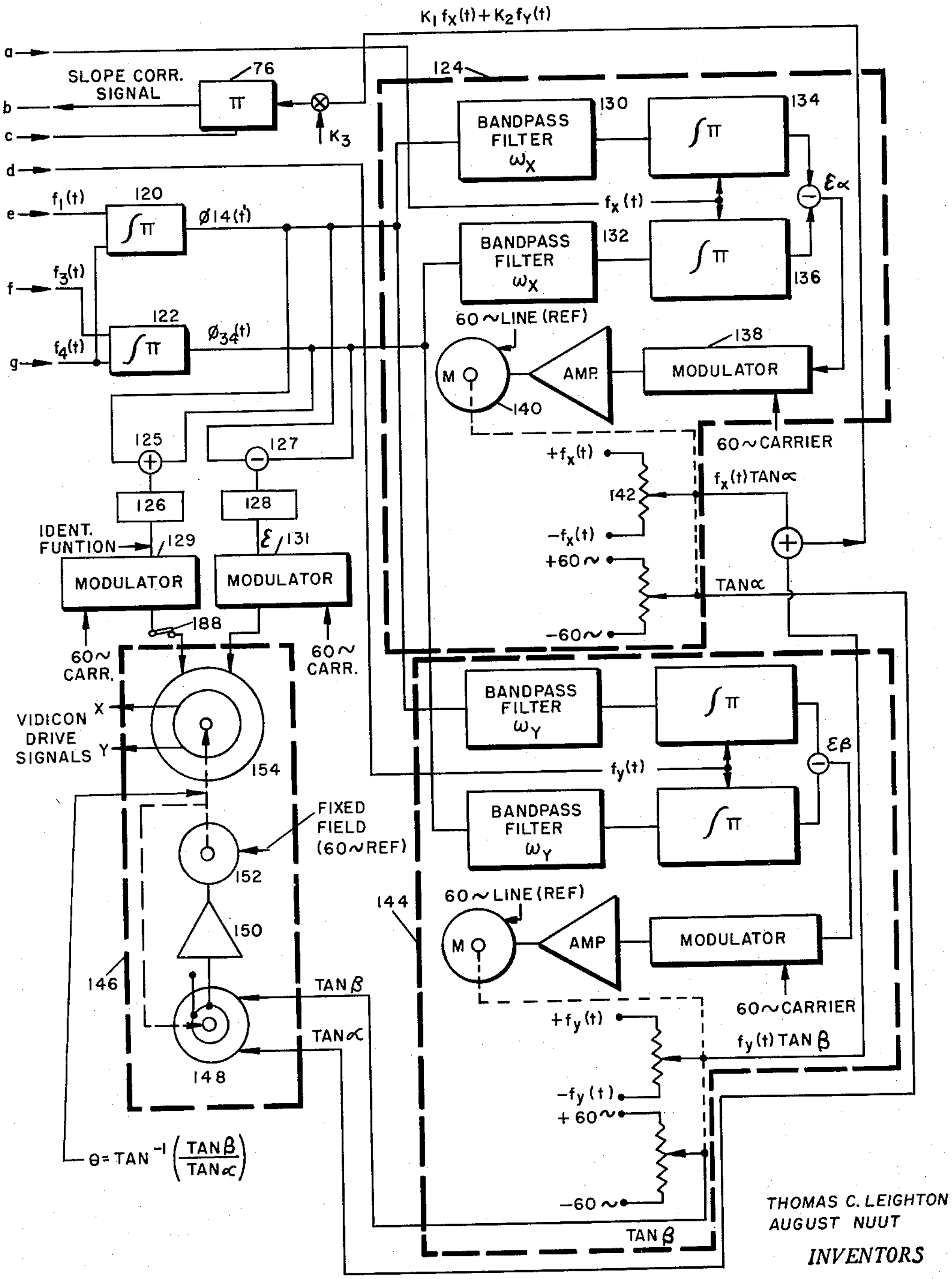
Figures 8, 8A:
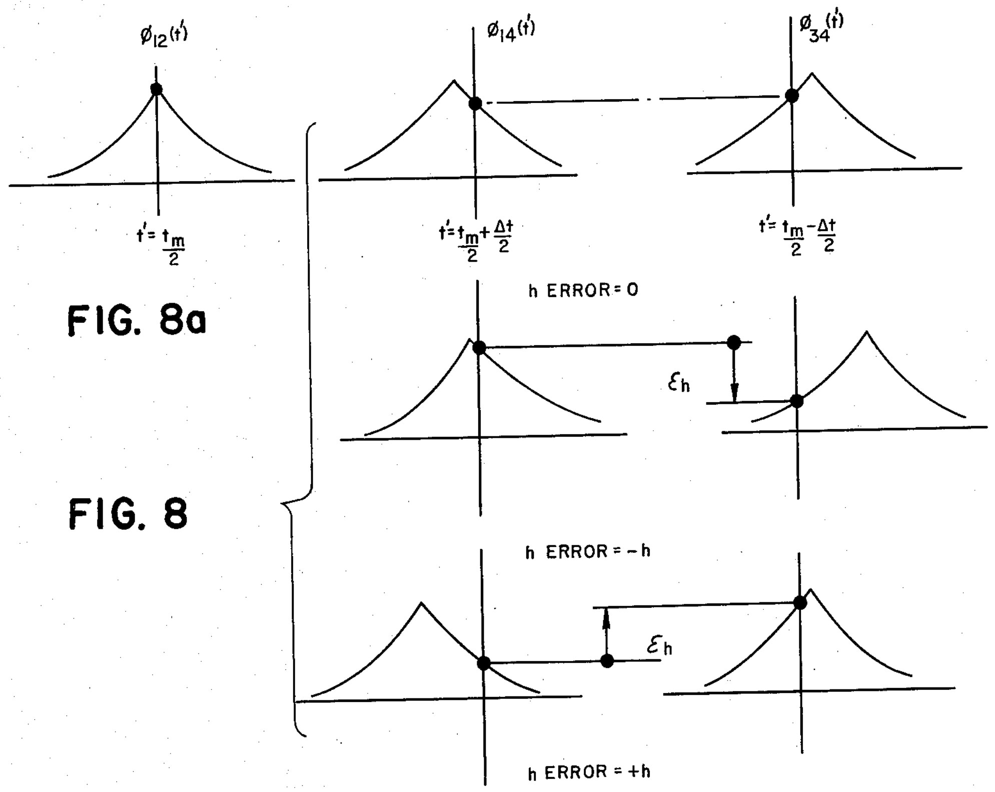
Figure 9:
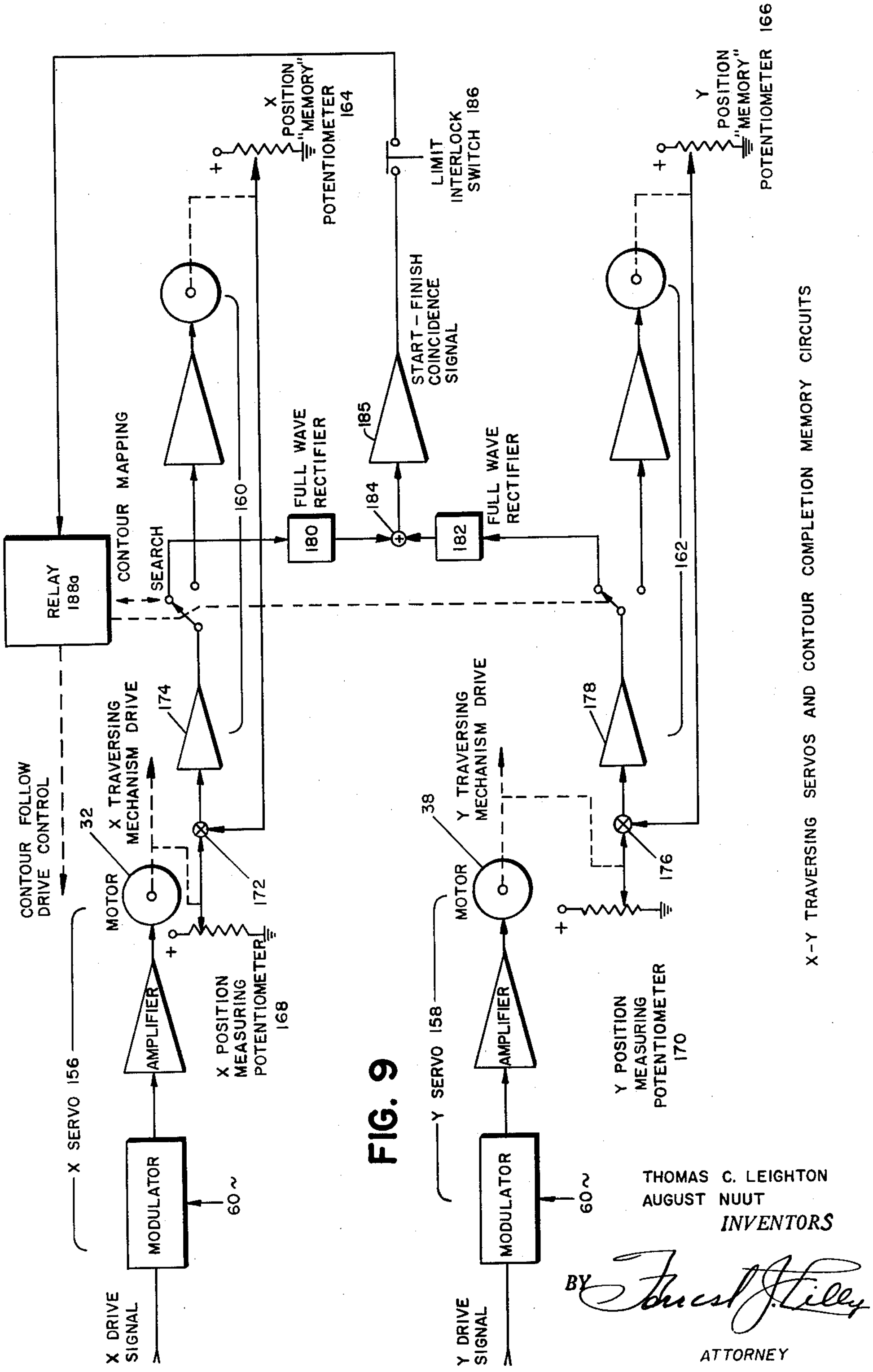
Figure 10:
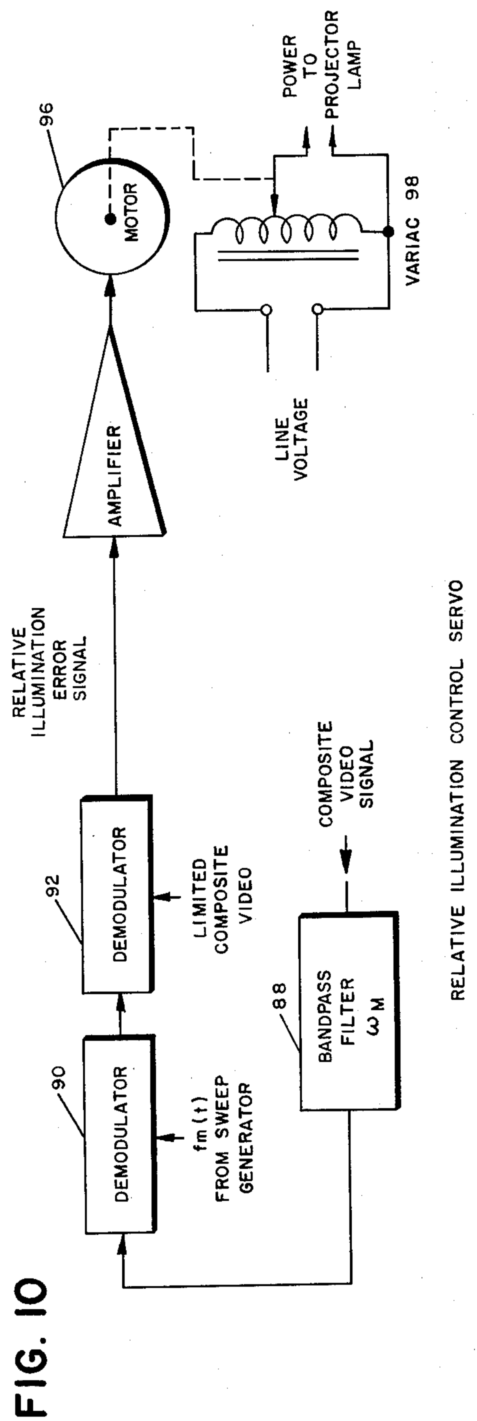
Figure 12:
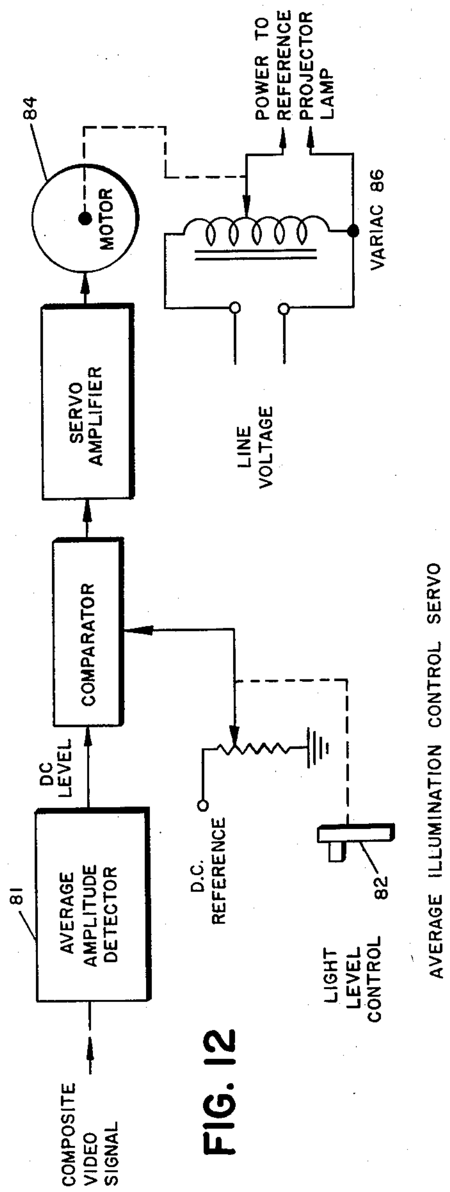
Figure 14:
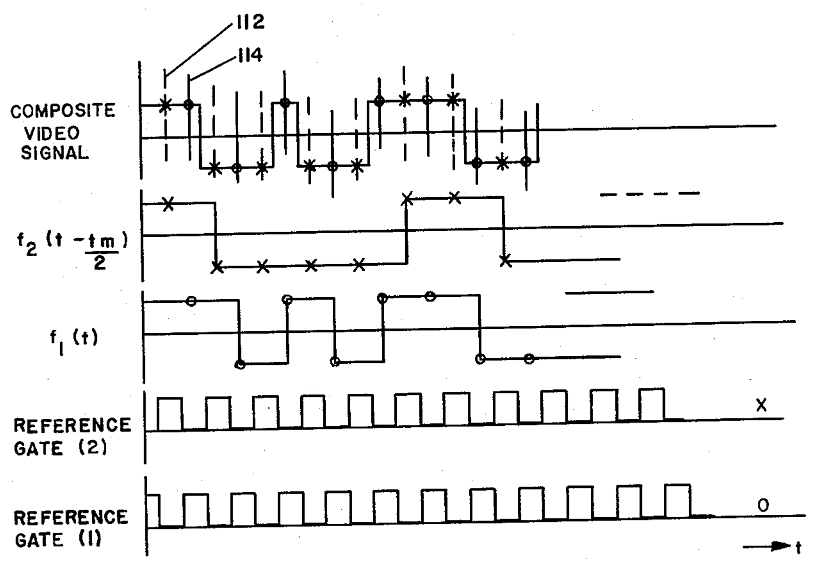
Figure 13:
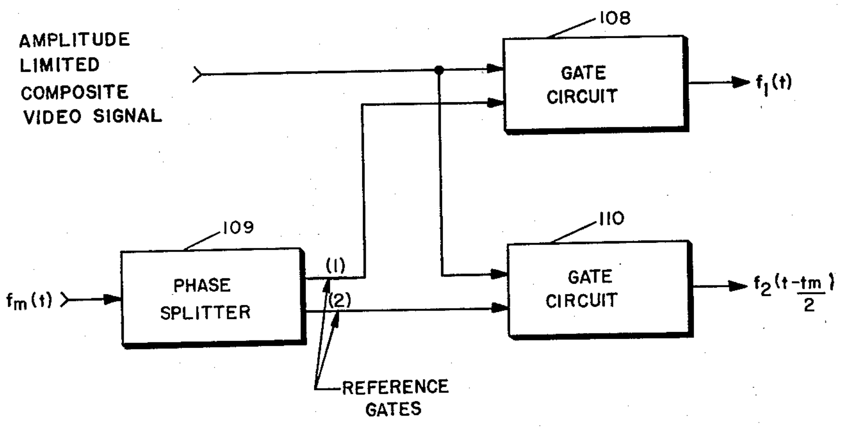
Figure 16:
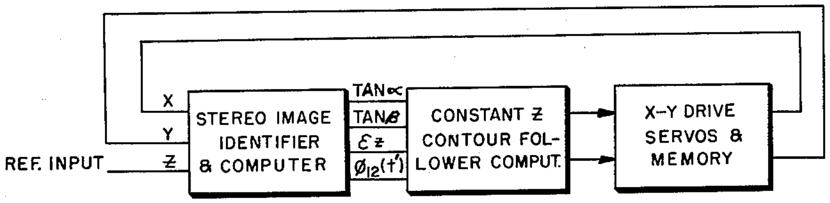
Figure 17:
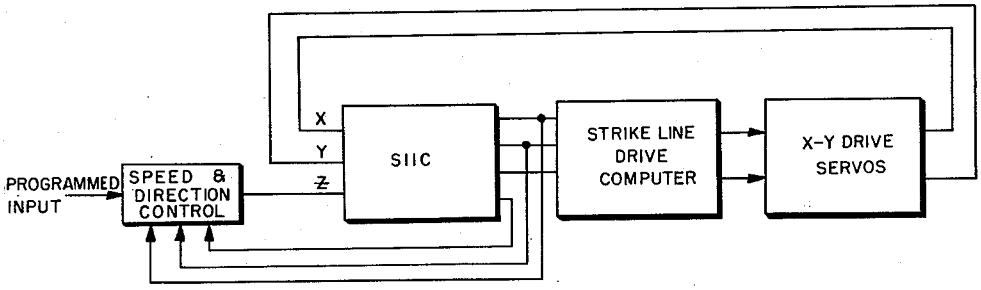
Figure 18:
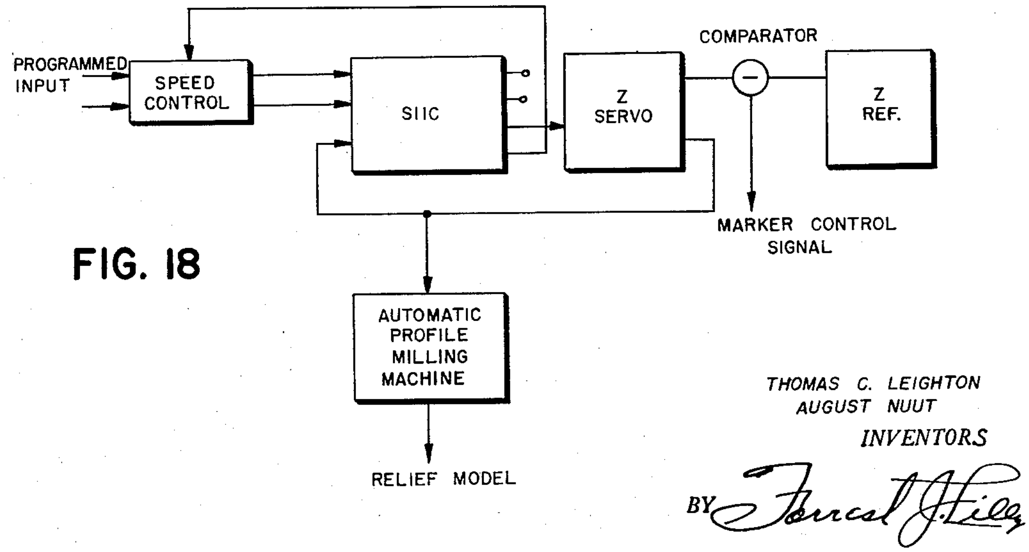

FIGURE 5*a* is a drawing illustrating waveforms from sweep generators used in the invention;

FIGURE 6 shows two stereo plan views of an isoceles truncated pyramid;

FIGURE 6*a* consists of drawings which illustrate the effect of stereo model random noise on output signals;

FIGURE 6*b* includes similar drawings which illustrate the effect of stereo model slope and noise;

FIGURE 6*c* comprises drawings showing the use of a periodic component to achieve high correlation;

FIGURE 7*a* and FIGURE 7*b*, together, is a detailed block diagram of a preferred embodiment of the invention;

FIGURE 8*a* is a chart illustrating a maximum correlation condition;

FIGURE 8 comprises charts which illustrate correlation processing for error detection;

FIGURE 9 is a diagram showing X—Y traversing servos and contour completion memory circuits;

FIGURE 10 is a diagram of the relative illumination control servo;

FIGURE 11 is a drawing of waveforms associated with the relative illumination control servo;

FIGURE 12 is a diagram of the average illumination control servo;

FIGURE 13 is a functional block diagram of a signal separator;

FIGURE 14 show waveforms for the signal separation process;

FIGURE 15 is a detailed, functional block diagram of a stereo image identifier and computer;

FIGURE 16 is a generalized block diagram of a contour plotting configuration;

FIGURE 17 is a generalized block diagram for a strike line plotting configuration; and FIGURE 18 is a generalized block diagram of a profile follower and means for marking points of equal elevation.

Figure 1:
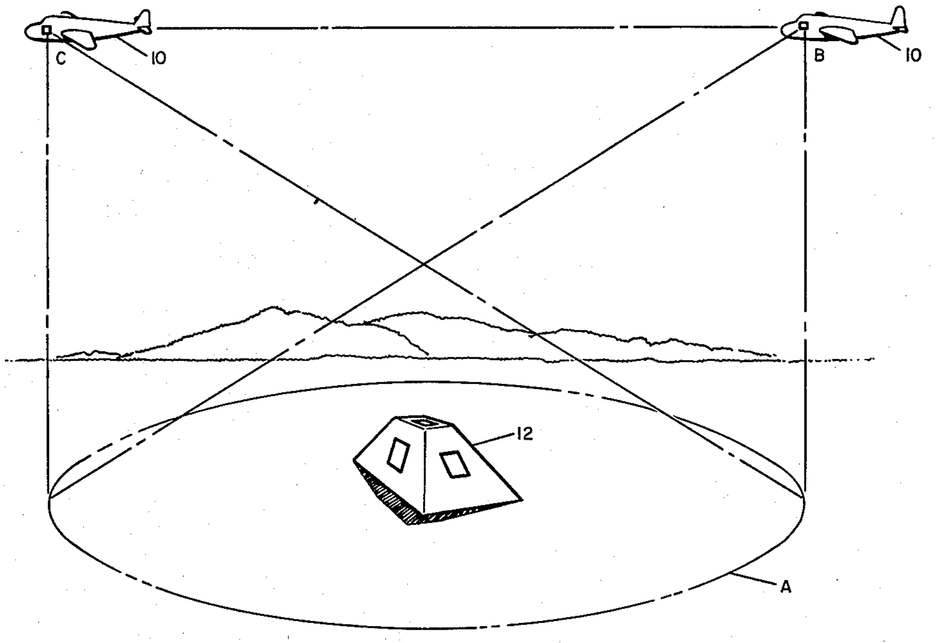
FIGURE 1 is a drawing illustrating the production of a stereo pair of photographs of terrain from an aircraft, for example.

Referring first to FIGURE 1, there is shown an airplane 10 which mounts an aerial camera therein for photographing terrain over which the aircraft flies. The airplane 10 preferably flies in a straight line and at a constant altitude, for example. The field covered by the camera is designated by the circular area A, and an isoceles truncated pyramid 12 is shown located at the center thereof. When the airplane 10 is at a position B, the camera is oriented and operated to photograph the region (area A) below. After the airplane 10 has traveled to position C symmetrically forward of pyramid 12, the camera is now oriented and operated to photograph the same area A. Of course, two (or more) cameras which are correctly oriented can be used instead of a single camera to produce the same results. In this manner, stereo diapositives can be produced for sections of terrain. The terrain can be usefully mapped from these diapositives.

Figure 2:
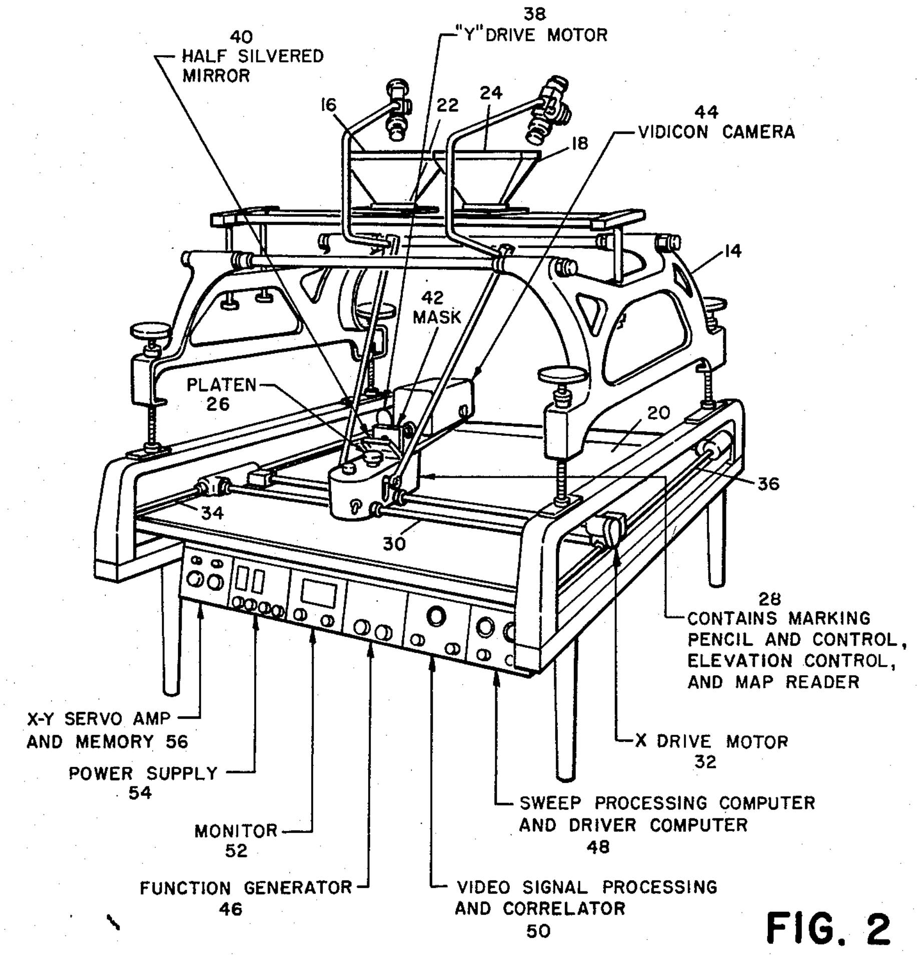
FIGURE 2 is a perspective showing a preferred embodiment of the present invention.

In FIGURE 2, a general perspective view of a preferred embodiment of the invention is shown. The physical configuration of the stereoplotter is generally that of a Kelsh-type stereoplotter and structure similar thereto is omitted from this description except as necessary. The entire frame 14 including projectors 16 and 18 can be similar to that of the Kelsh device. Stereo diapositives are inserted respectively in slides 22 and 24 and are projected onto a 48 by 60-inch plotting surface 20. A f/60 lens system having a large, 190 mm. depth of focus is used to produce a stereo model over the plotting surface 20.

The usual viewing platen 26 is provided on and above housing 28 which contains a marking pencil, control means for the pencil and means for controlling elevation of the platen 26. The housing 28 is adapted to be moved in an X direction along the axis of an X lead screw 30 which is driven by X drive motor 32. Similarly, the platen 26 and housing 28 can be moved in a Y direction, at right angles to the X direction, by means of Y lead screws 34 and 36 which are driven by Y drive motor 38. It is to be noted that all wiring and interconnecting leads have been deleted from this figure for clarity of illustration.

Figure 3:
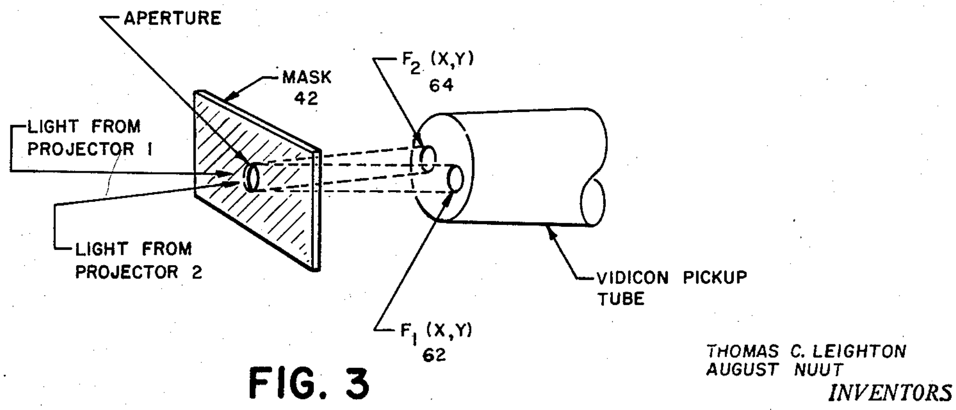
FIGURE 3 is a drawing of a mask positioned before the photocathode of a vidicon tube illustrating the formation of two stereo images thereon.

The present invention provides a half silvered mirror 40 suitably disposed to pass light from the two projectors 16 and 18 onto the viewing platen 26 and at the same time reflect light through a mask 42 having a small aperture therein to a vidicon camera 44, for example. The effect of the mask 42 is to permit rays of light to pass through the aperture such that the image portion 62 (FIGURE 3) due to one diapositive is projected on one half of the photocathode and the corresponding image portion 64 due to the other diapositive is projected on the other half. Thus, simultaneous reproduction of the two stereo views are provided on certain sections of the photocathode of the vidicon tube.

Figure 4:
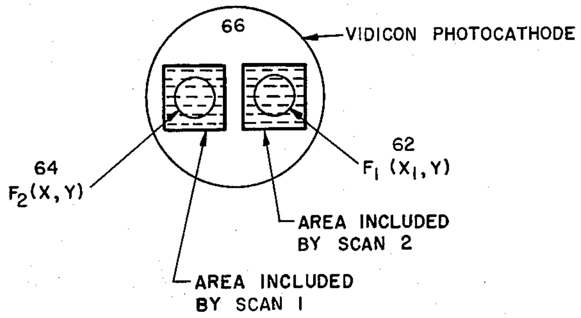
FIGURE 4 is a plan view of the photocathode illustrating a preferred scan pattern thereon.

The two stereo images are reproduced on the photocathode of the vidicon tube as indicated in FIGURE 4. This presents a configuration easily susceptible of substantially simultaneous scanning by the electron beam. A point is energized by the beam in one stereo image and then the beam is deflected to energize a point in the other image. Any intervening information (signal) therebetween is gated out. This process is continued in sequence so that the scan information pattern 66 illustrated in FIGURE 4 is achieved.

A function generator 46 (FIGURE 2) provides suitable sweep and gating signals which cause the electron beam in the vidicon tube to scan in the desired pattern and provide the desired output information. The horizontal sweep signal is, in addition, processed by a sweep processing computer to modify the relative velocities over each image for reasons as will be explained later. The sweep processing computer is included in a sweep processing computer and driver computer unit 48. A video signal processing and correlator unit 50 is located between generator 46 and unit 48 in FIGURE 2. Similarly, a monitor 52, power supply 54 and an X—Y servo amplifier and memory 56 can be mounted as illustrated. The monitor 52 and power supply 54 are standard items.

Figure 5:
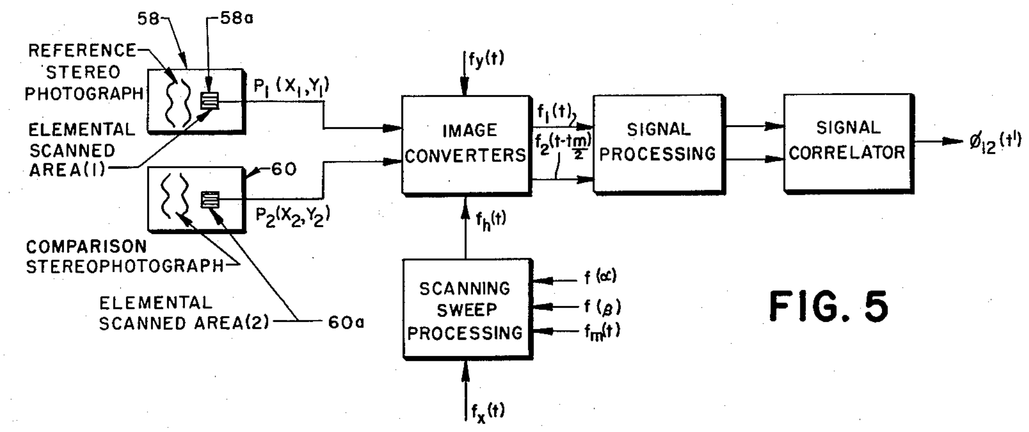

Simulation of the normal visual perception of a person performing the function of locating and identifying a point or locus of points in a stereo model is accomplished by this invention in the following general manner. Referring to FIGURE 5, two stereo photographs 58 and 60 are indicated in which an image portion 58a and a corresponding image portion 60a are being scanned. Picture information for 58a is a function of position and can be identified as $P_1\ (X_1, Y_1)$. Similarly, information for 60a can be identified as $P_2\ (X_2, Y_2)$. It is necessary to convert this data from a spatial domain to that for an equivalent time domain. These signals are respectively identified as $$f_1(t) \text{ and } f_2\left(t-\frac{t_m}{2}\right)$$

and are derived by photoelectric scanning.

Scanning is governed according to vertical sweep and horizontal sweep signals. The horizontal sweep function, $f_h(t)$, is the result of processing of stereo model horizontal sweep $f_x(t)$ by functions of slope in the X and Y directions, namely, $f(\alpha)$ and $f(\beta)$. The sweep function $f_x(t)$ is further affected by the multiplexing signal function $f_m(t)$. The vertical sweep function $f_y(t)$ is not processed because the scan is selected parallel to the line of parallax displacement.

The two electric messages $$f_1(t) \text{ and } f_2\left(t-\frac{t_m}{2}\right)$$

are processed by filtering and limiting and provided to a signal correlator. The process of correlation performed by the signal correlator is the means whereby identification and location of two corresponding points in the two stereo photographs is established. The mathematical function which must be performed by the signal correlator is:

$$\phi_{12}(t')=\frac{1}{2T}\int_{-T}^{T} f_1(t) f_2\left(t-\frac{t_m}{2}+t'\right)dt \quad \text{(Eq. 1)}$$

where $\phi_{12}(t')$ is the correlation function, $t'$ is the time delay between $$f_1(t) \text{ and } f_2\left(t-\frac{t_m}{2}\right),\ \frac{t_m}{2}$$

is the time multiplexing time delay, and T is the time duration of the signals $$f_1(t) \text{ and } f_2\left(t-\frac{t_m}{2}\right)$$

where T is very long compared to the longest periodicity present in either of these two signals. ($t_m=0$ if both images are scanned simultaneously.)

It can be seen that $\phi_{12}(t')$ will be a maximum when $$t'=\frac{t_m}{2}, \text{ and } f_1(t)=f_2(t)$$

This is illustrated by FIGURE 8*a*. The quantities $t'$ and $t_m$ are generated by signal processing circuits and are controllable variables. The functions $$f_1(t) \text{ and } f_2\left(t-\frac{t_m}{2}\right)$$

are the results of scanning of the stereo images and, as a result, the probability of these functions ever being equal is very low. It is the function of the scanning sweep processing circuits and the signal processing circuits to modify one function with respect to the other so that the correlation function is maximized.

FIGURE 5*a* shows the waveforms for $f_x(t)$, $f_y(t)$ and $f_m(t)$ which are produced by sweep generators in the device. As is clearly indicated in this figure, the waveforms are sawtooth and square (actually trapezoidal) waves. Periods for a cycle of each wave are marked in the figure as examples only. The sweep generators are located in unit 46 (FIGURE 2).

Referring to FIGURE 6, a stereo view of pyramid 12 as photographed from point B (FIGURE 1), is shown on the right. Similarly, the stereo view of pyramid 12 as photographed from point C is shown in FIGURE 6 to the left. Three corresponding areas $A_1$—$A_2$, $B_1$—$B_2$ and $C_1$—$C_2$, and three corresponding lines $LA_1$—$LA_2$, $LB_1$—$LB_2$ and $LC_1$—$LC_2$ are respectively shown on three different slopes of truncated pyramid 12, for example.

Scanning of idealized areas C and A is shown in FIGURES 6*a* and 6*b*, respectively. FIGURE 6*c* illustrates the effect of modifying relative sweep time to achieve a high correlation. In FIGURE 6*a*, pictoral anomalies which correspond to electrical noise are shown as irregular shaped areas such as 68 and 70. Scan is from left to right from top to bottom. For the pattern illustrated, and for areas $C_1$—$C_2$, the waveforms for $f_1(t)$ and $f_2(t)$ are obtained. In this instance, +1 corresponds to the cross-hatched squares and −1 corresponds to the un-hatched intervening squares. The last curve derived as the integrated product of $f_1(t)$ and $f_2(t)$ indicates that a high correlation results because of the identical area images. The effect of the pictoral anomalies on the correlation is dependent on the number of pictoral elements that are integrated in a complete scan.

In FIGURE 6*b* the effect of scanning a line or area such as $A_1$—$A_2$ at the same scan velocity for each line is illustrated. The average correlation is very low as indicated by the broken line 72. A periodic component is present, however, corresponding to the arrows 74 shown in the correlation curve. This periodic component is used to cause the relative sweep velocities to be modified so that the same high correlation is obtained as when area $C_1$—$C_2$ was scanned. This is illustrated in FIGURE 6*c*. The distance covered from $t_1$–$t_4$ for $A_1$ is extended and that for $A_2$ is seen to be narrowed. When a high correlation is obtained, the recording pencil is positioned to mark the paper and withdrawn if the correlation falls too low.

In a manner analoguos to that described above, the effect of an area such as $B_1$—$B_2$ of the stereo model slope is to cause scan lines to become progressively uncorrelated about some one line for which correlation is high. The average correlation is low, but a periodic component exists at the Y scan frequency. The use of this periodic component to relatively displace successive scan lines in order to obtain high correlation for an area will be described.

Scan processing-slope matching. From a consideration of the stereo geometry and equations, it can be seen that no processing of the Y scanning function is required because little or no relative difference exists in relative Y dimensions.

Elementary stereo equation:

$$h=\frac{H(\delta X_n)}{\frac{fW}{H}+\delta X_n} \quad \text{(Eq. 2)}$$

where $h$ is elevation of (P(X, Y) above the reference elevation
H is the mean camera height above the reference elevation
W is the base distance between carema stations $f$ is the focal length of the camera
$\delta X_n$ is the difference between the parallax displacement of P(X, Y) and the parallax displacement of $P_0(X_0, Y_0)$ in the reference elevation plane as measured in the stereo photographs with no scale changes.

Approximate stereo equation:

$$h \cong G(\delta X_n \quad \text{(Eq. 3)}$$

If $$\frac{fW}{H} >> \delta X_n$$

Eq. 3 is a close approximation to Eq. 2. The constant G includes the parameters $f$, W, H and all projection scale factors.

Slope equations (definitions):

Let the stereo model slope $$\frac{dh}{dx}=\tan \alpha$$

then:

$$\tan \alpha=\frac{d(\delta X_a)}{dx} \quad \text{(Eq. 4)}$$

when G=1

Let the stereo model slope $$\frac{dh}{dy}=\tan \beta$$

then:

$$\tan \beta=\frac{d(\delta X_\beta)}{dy} \quad \text{(Eq. 5)}$$

when G=1

From Equations 4 and 5:

$$\frac{dx}{dt}\tan \alpha=\frac{d(\delta X_a)}{dt} \quad \text{(Eq. 6)}$$

$$\frac{dy}{dt}\tan \beta=\frac{d(\delta X_\beta)}{dt} \quad \text{(Eq. 7)}$$

By definition, let $$\frac{dx}{dt}=f_x(t) \text{ and } \frac{dy}{dt}=f_y(t)$$

Thus, summing for the relative sweep difference slope correction signal $$f_c(t)=f_{H2}(t)-f_{H1}(t)=f_x(t)\tan \alpha+f_y(t)\tan \beta \quad \text{(Eq. 8)}$$

In the case that the subject invention is only required to plot points of equal elevation, either $\alpha$ or $\beta$ correction may be used (line matching) or both corrections may be used together (area matching).

Scan processing-force function for error detection.

The scan processing described thus far has not taken account of the necessity for error polarity detection and correction, and has only dealt with the necessary processing to establish maximum correlation. A method by which the maximum value of the correlation function is ascertained and deviations measured is available. This processing is necessary because the correlation function is an even function about $$t'=\frac{t_m}{2};\text{ where }\frac{t_m}{2}$$

is the time sharing delay (which is equal to zero when $f_1(t)$ and $f_2(t)$ are obtained simultaneously).

FIGURE 8 illustrates a method whereby the deviations from the maximum value of the correlation function are measured. Three conditions in which the $h$ error is 0, $-$, and $+$ are shown in order. $f_1(t)$ is correlated with $$f_2\left(t+\frac{\Delta t}{2}\right)=f_4(t)$$

and $f_3(t)=f_1(t+\Delta t)$ is correlated with $f_4(t)$. Correlation plots for $$t'=\frac{tm}{2}+\frac{\Delta t}{2}$$

are shown in the left column of FIGURE 8, and in the right for $$t'=\frac{tm}{2}-\frac{\Delta t}{2}$$

An error in elevation results in an error voltage with appropriate sign and magnitude. This process can be simultaneous or multiplexed.

Detection of the X periodic component in $\phi_{14}(t')$ and $\phi_{34}(t')$ is accomplished with bandpass filtering of each correlation function. Correlation of these periodic components $f_{13}(\alpha)$ and $f_{14}(\alpha)$ with $f_X(t)$ produces two voltages, the difference of which provides the necessary error signal to operate the sweep processing circuits which match the $\alpha$ slope of the stereo model.

Detection of the Y periodic component is accomplished with bandpass filtering at the Y scan frequency. Correlation of these periodic components $f_{14}(\beta)$ and $f_{34}(\beta)$ with $f_y(t)$ produces two voltages, the difference of which provides the necessary error signals to operate the sweep processing circuits which match the $\beta$ slope of the stereo model.

With the aforementioned functions performed, maximum correlation is obtained.

With the description that follows, normal minimized error operation is assumed and the effects of deviation from normal operation will be described. The process of image comparison and identification begins with the projection of two images from the individual projectors 16 and 18 through an aperture in an opaque mask 42 onto the photocathode of a vidicon pickup tube. (FIGURE 2.) Relative elevation of the plane of the opaque mask (and platen) provides the measure of stereo model elevation and correspondingly, topographic elevation. Due to the aperture in the opaque mask 42 and the lines to each of the projectors, the small corresponding areas of each stereo photograph are projected as separate images on the face of the vidicon pickup tube. The process of scanning the two corresponding images on the photocathode of the vidicon pickup tube is done in the manner previously shown in FIGURE 4.

A raster was generated in accordance with commercial television standards (as described in the RCA Industry Service Laboratory report FB851 entitled, "An Industrial Television System" and in an RCA brochure entitled "Vidicon Component" in which components for, and means of generating sweeps are described in detail). Of course it is necessary in this instance to scan two images on the photocathode of the vidicon pickup tube. For this purpose, a third sweep waveform $f_m(t)$ is generated. This third wave form is a square wave with a frequency fifty times greater than the horizontal scan frequency. Thus, by adding the high frequency square wave deflection current to the horizontal sawtooth deflection current both images are scanned fifty times for each line and with 262½ lines for each area in a 60th of a second. The process of generating and manipulating waveforms of this fashion is well-known (and is described in chapter 5, volume 19 of the Massachusetts Institute of Technology Radiation Laboratory Series, entitled "Waveforms"). The composite video signal resulting from this scanning process may be described as dot sequential multiplexed.

Relative processing of the horizontal sweep $f_x(t)$ is done as indicated in FIGURES 7*a* and 7*b* by modulating the multiplexing high frequency square wave $f_m(t)$ with the summation of the three correction factors; one for X slope correction, $(K_1f_x(t))$, one of Y slope correction, $(K_2f_y(t))$ and the third $(K_3)$, an adjustment of the mean position between rasters corresponds to the mean distance between the two projected image areas. It is obvious that the mean amplitude of the multiplexing square wave $f_m(t)$ would control the mean spacing between the rasters. Changing the amplitude of the square wave in synchronism with the sweep sawtooth results in a relative velocity difference of scan for the two images. This process corrects for X slope error as illustrated in FIGURE 6*a*, 6*b* and 6*c*. Changing the amplitude of the square wave in synchronism with the Y scan sawtooth results in a relative varying displacement between successive scan lines. This process corrects for Y slope.

The process of modulation is a well-known art (and has been described in the chapter entitled "Electrical Amplitude Modulation," chapter 11, volume 19 of the M.I.T. Radiation Laboratory series, entitled "Waveforms"). In this instance a single diode modulator 76 (FIGURE 7*b*) is utilized in the modulation of $f_m(t)$. The process of addition or mixing is also well-known (and is described in chapter 18, entitled "Mathematical Operations On Waveforms" of the aforesaid volume 19).

Two illumination control servos are indicated in FIGURE 7*a*. One servo 78 corrects the average illumination level of the elemental area. This servo is detailed in FIGURE 12, and the other 80 (detailed in FIGURE 10) controls the relative illumination of the two images so that both have equal average illumination. Average illumination control is mechanized by first measuring the amplitude of the video signal from amplifier 100 by means of an amplitude demodulator 81 (see FIGURE 12). The result is a D.C. voltage which corresponds to the average illumination level, and is compared with a reference voltage which is set by a light level control knob 82. The difference between these two voltages is used to operate a motor 84 which in turn adjusts the variac 86 or variable auto transformer which adjusts the voltage to the lamp and projector until the error between the actual illumination and the desired illumination is zero. This is conventional servo process well-known in the present state of the art.

While the average illumination is being controlled for one image, the relative illumination control servo 80 is also operated. Its function is to maintain a relative illumination which produces video signals of equal average amplitude. The relative illumination control function (FIGURE 10) is performed by means of filtering the composite video signal from amplifier 100 with a conventional band pass filter 88 tuned for the multiplexing frequency. The output of the bandpass filter 88 is synchronously demodulated with a diode ring modulator 90 (or by any other demodulator means described in chapter 14, volume 19 of the M.I.T. Radiation Laboratory series). The resulting difference output is de-modulated by demodulator 92 with reference to the amplitude limited composite video signal from limiter 104 (FIGURE 7*a*) to establish the polarity for the desired correction of relative illumination. This demodulation too is done by means of a conventional ring demodulator 92.

The required signal processing is illustrated in FIGURE 11 which shows two sets of illustrated waveforms. One set of waveforms, to the left of line 94, illustrates a positive relative illumination error, and the other, to to the right of 94, a negative relative illumination error. The relative illumination error signal is amplified and drives a motor 96. This motor adjusts a variac 98 which in turn changes the voltage to the second projector light an amount and in the appropriate direction so that the relative illumination error is maintained near zero at all times. By controlling the average and relative illumination levels, undesired signals are minimized.

The composite video signal from amplifier 100 (FIGURE 7*a*) is passed through a high pass filter 102 which is designed to attenuate components of the video signal resulting from illumination variations at a line rate. Filtered, the composite video signal is next passed through an amplitude limiter 104. The function and operation of the amplitude limiter is the same as used in frequency modulation communications systems and can be performed by biased diodes, as an example. The filtered and processed composite video signal is next introduced into a signal separator circuit 106 which decodes the composite video signal and produces two processed video signals which correspond to the two optical images on the face of the vidicon pick-up tube. The signal separator, FIGURE 13, consists of two gate circuits or demodulators 108 and 110 which are alternately gated so that one processed video signal will be passed through its gate circuit at the same time 112 (FIGURE 14) the corresponding video image is being scanned. Alternately, the second video signal is gated on at a time 114 (FIGURE 14) when its corresponding image is being scanned. The 0 marks indicate points where $f_1(t)$ changes to conform with the composite video signal (top curve) condition when the reference gate (1) signal is high. Similarly, $$f_2\left(t-\frac{tm}{2}\right)$$

is changed at the *x* points to conform with the composite video signal condition. The gate circuits are balanced diode demodulators and are each controlled according to the output from phase splitter 109 which generates the waveforms illustrated by the lower two curves of FIGURE 14.

Following the signal separation process, each of the two video signals is delayed by means of conventional electromagnetic delay lines 116, 118 (electromagnetic delay lines are described in chapter 6 of the Components Handbook, volume 17 of the M.I.T. Radiation Laboratory Series; also chapter 22 of volume 19). Three signals $f_1(t)$, $f_3(t)$, $f_4(t)$ are now available, appearing on leads *e*, *f* and *g*. These signals are routed as shown in the block diagram FIGURE 7*b* into two correlators 120 and 122. The function of these correlators is to obtain two different values $\phi_{14}(t')$, $\phi_{34}(t')$ of the correlation function for two correspondingly different delay times. Thus, it is possible to measure not only the average value of the correlation function by summing $\phi_{14}(t')$ and $\phi_{34}(t')$ with adder 125, but also derive an elevation (positional) error signal $\epsilon$ by measuring the difference between $\phi_{14}(t')$ and $\phi_{34}(t')$, with subtractor 127 (as shown in FIGURE 8).

As shown by Eq. 1 above, the process of correlation consists of integrating the product of two variables. The product of two functions of time is obtained in this instance by means of a multigrid vacuum tube multiplier in 120 and in 122 (such as is described in volume 19, chapters 18 and 19 of M.I.T. Radiation Laboratories Series). Approximate integration of the product by filters in 120 and in 122 is also conventionally done (as indicated in the same latter referenced chapters). The time constants of the filters used at the output of the correlators are relatively short compared to the period of line scanned so that periodic components at the line scan frequency are not attenuated before they can be used by the *x* slope computer 124 (FIGURE 7*b*). The average value of the correlation functions as well as the difference of the correlation functions or position error signal are each integrated with low pass filters 126 and 128, each having a time constant which is longer than 1/60 of a second so that an entire area is integrated. The output from 126 is the identity function and that from 128 is the positional error signal $\epsilon$.

To operate the X slope servo, the two values of the correlation function are individually filtered through identical bandpass filters 130 and 132 tuned to the line scan frequency. The output of each bandpass filter is respectively connected to a synchronous demodulator 134 and 136. The X scan $f_x(t)$ sawtooth waveform is used to synchronously demodulate each of the two channels. The difference between the two demodulator outputs is the error signal $E_a$ which indicates the direction of correction required to process the line scan velocity so that corresponding points of the projected images are scanned at the same time. The error signal passed through a modulator 138 is amplified, and operates a motor 140; rotation of the motor turns a potentiometer 142 which has its extreme ends connected to equal and opposite phases of horizontal frequency sawtooth waveform $f_x(t)$. The motor rotates as long as there is an error signal and stops when the error signal goes to zero. When the error signal goes to zero the shaft position of the motor and potentiometer is a measure of the mean slope of the stereo model.

The Y slope computer 144 functions in an analogous fashion. The only difference being that the field scan frequencies are filtered and demodulated by $f_y(t)$ instead of the line scan frequencies $f_x(t)$. This completes the description of what is termed the Stereo Image and Identifier and Computer as shown in FIGURE 15. The four outputs tan $\alpha$, tan $\beta$, E, and identity function of the Stereo Image Identifier and Computer are utilized for automatic contour following and contour plotting, as an example.

The contour follower computer 146 which is shown in FIGURE 7*b* consists of two parts. The first part is an inverse tangent computer (which is described on pages 118 and 119, chapter 5 of volume 21 of Radiation Laboratories Series entitled "Electronic Instruments") and consists of resolver 148, an amplifier 150, and motor 152. The second part of the computer is a coordinate converter which is a standard A.C. resolver 154 coupled to the output shaft of the inverse tangent computer. Two phase-to-two phase resolvers are well known, commercially available components. The identity function from 126 and the positional error signal from 128 are respectively used to modulate a 60 c.p.s. carrier by modulators 129 and 131 and applied to the two input phase windings of resolver 154. Two outputs are obtained from the contour follower computer 146 as indicated in FIGURE 7*b*. These two signals are the X and Y drive signals which are used to operate the X drive servo and the Y drive servo respectively.

FIGURE 9 shows the X and Y traversing servos and contour completion memory circuits which are to be described next. The X (156) and Y (158) servos are conventional and are used to position the X (30) and Y (34, 36 of FIGURE 2) traversing mechanisms which in turn move the vidicon camera 44 and associated optical equipment. So long as the mechanism is not automatically following a contour, a second set of self-balancing potentiometer type servos 160, 162 follow the shaft position of the traversing servos. Examples of self-balancing potentiometers servos are the Brown self-balancing potentiometers and the Hycon Mfg. Company digital voltmeter which is a self-balancing potentiometer.

When a starting point has been established and when the equipment is put on automatic contour follow, the self-balancing potentiometer circuits are disconnected by energizing relay 188*a* leaving the memory potentiometers 164, 166 set at a position which corresponds to the X, Y coordinates of the starting point. Difference between the X position measuring potentiometer 168 and the memory potentiometer 164 and difference between the Y position measuring potentiometer 170 and the memory potentiometer 166 are measured by the same comparators 172, 176 and amplified by the same amplifiers 174, 178 in each of the self-balancing potentiometer servos, 160, 162 as when the servos are working in their normal fashion. In the contour mapping condition; however, these different signals are passed through full wave rectifiers 180 and 182 first to establish an absolute magnitude of error and then the X and Y errors are summed. As a result the output of the adder 184 will only be zero for one value of X and Y in the mapping area. In this condition, the output of start-finish amplifier 185 falls to zero, de-energizing relay 188*a*.

Once started the contour follower will drive until it comes back to its original position at which time it will stop; or until it runs to the edge of the mapping area at which time limit switches 186, for example, will stop it at the limit of the map. The contour follower drive velocity is proportional to the identity function magnitude (output from 126). The means provided for stopping the servos therefore is to disconnect by means of switch 188 the correlation signal from the coordinate converter 154 shown in FIGURE 7*b*. The contour drive control switch 188 is opened on de-energization of relay 188*a*. The contour mapping device described herein is therefore capable of drawing a complete contour and stopping at the point where it started, or if the contour runs to the edge of the mapping area it will stop at the edge of the map.

FIGURE 15 is the general functional block diagram of the Stereo Image Identifier and Computer. In broad terms, the block diagram relates the functions of the optical comparator and transducer 190 which consists of the vidicon camera and the associated sweep generating equipment, a stereo projector system such as that of a Kelsh stereoplotter, and the X, Y and Z traversing mechanisms which are used to position the vidicon camera in three dimensions relative to the stereo model projected by the Kelsh stereoplotter from the two stereo photographs 194. The output of the optical comparator and transducer 190 is a composite video signal. The composite video signal is a function of the spatial position of the vidicon camera and the illumination profile being scanned from each stereo photograph. Necessary processing of the composite video signal is done by the image identifier 192. The video signal is amplifier by conventional amplifier means, filtered to remove unwanted frequency components which are generated by the scanning process, and amplitude limited in a manner which is well-known in the frequency modulation communication art. The resulting processed composite video signal is then decoded to provide two video signals which are counterparts of the two images projected originally by the Kelsh stereoplotter or its equivalent.

The two video signals are individually delayed by transmission through suitable, conventional electromagnetic delay lines so that the mathematical operation of cross-correlation can be performed. The process of cross-correlation produces error signals in addition to the average value of the correlation function which is a measure of identity between the illumination profiles that are scanned for each of the two stereo photographs. The X slope computer 124 integrates the X slope error and causes the relative scanning velocities of the optical comparator to be modified as described in the theory and shown in FIGURES 6*a*–6*c*. The Y slope computer 114 integrates the Y slope error and causes the relative X scan displacement to be modified as a function of the Y scan position. The positional error computer 196 measures the difference in values of the correlation functions $\phi_{14}(t')$ and $\phi_{34}(t')$ and thereby produces a position error signal. The identity function is the average value of the correlation function measured for a period of time slightly greater than that required to scan comparable elemental areas of each of the two stereo photographs.

Typical applications of the stereo image identifier and computer are shown in FIGURES 16, 17 and 18, which are schematically drawn. These applications include the automatic plotting of equal elevation contour lines for producing topographic contour maps, strike line maps, and profile maps. By using the Stereo Image Identifier and Computer in a profile follower configuration and in connection with an automatic profile milling machine, three dimensional relief maps can be produced directly from two stereo photographs.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

In order to comply with the statute, the invention has been described in language more or less specific as to structural features. It is to be understood, however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A stereoplotter, comprising: means for forming a stereo model over a plane surface from a pair of stereo pictures; an electronic pickup tube having a photosensitive target; means for forming an image of a portion of each stereo picture on different sections of said photosensitive target; plotting means for drawing curves on said plane surface coupled to said image forming means; means for scanning said images to produce two electrical signals which are functions of time; means for correlating said electrical signals; means for regulating said scanning means to produce a maximum correlation condition; and means for moving said image forming means over said stereo model in a path maintaining a maximum correlation condition.

2. Apparatus in accordance with claim 1 including, in addition, means for varying the illumination of said stereo pictures to form images whereby said scanning means produces two electric signals of equal average amplitude.

3. In a stereoplotter including means for forming a stereo model over a plane surface from a pair of stereo pictures, in combination: means for converting each stereo picture from a space picture to an electrical picture; means for scanning said electrical pictures to produce two electrical signals which are functions of time; signal correlator means for performing the mathematical process of correlation, said correlator means being adapted to receive and correlate said electrical signals; and means connected to said correlating means for deriving stereo model slope error signals for regulating said scanning means to produce a maximum correlation condition.

4. Apparatus in accordance with claim 3 including, in addition, means for varying the illumination of said stereo pictures to form electrical pictures of intensities whereby said scanning means produces two electric signals of equal average amplitude.

5. A stereoplotter, comprising: means for forming a stereo model over a plane surface from a pair of stereo pictures; an electronic pickup tube having a photosensitive target; means for forming an image of a portion of said stereo model from each stereo picture on different sections of said photosensitive target; plotting means coupled to said image forming means; means for scanning said images to produce two electrical signals which are functions of time; means for correlating said electrical signals to produce two output signals; means connected to said correlating means for measuring slope in one direction of the portion of said stereo model being scanned; means connected to said correlating means for measuring slope in another direction of the portion of said stereo model being scanned; means for measuring the average sum value of the two output signals from said correlating means; means for measuring the difference value of the two output signals from said correlating means; and means connected to all said measuring means for moving said image forming means over said stereo model in a path maintaining a maximum correlation condition.

6. Apparatus in accordance with claim 5 wherein said scanning means include time delay means for producing two electrical signals which are relatively delayed in time.

7. Apparatus in accordance with claim 5 wherein said slope measuring means each include filter means for detecting periodic components from said correlating means output.

8. In a stereoplotter including a pair of stereo pictures for producing stereo images therefrom and forming a stereo model, means for comparing stereo image areas corresponding to a common area on the surface of said stereo model, comprising: means for forming an image of the common area respectively from each stereo picture, each image being a message in space domain; means for converting each image from a space domain message to an equivalent time domain message, said converting means including means for scanning said image areas and means responsive respectively to the scanned areas detail for producing two time dependent signals; signal correlator means for performing the mathematical process of correlation, said correlator means being adapted to receive and correlate said two time domain messages; and means responsive to a predetermined degree of correlation of said time domain messages for generating a signal indicating identity of said compared areas according to a desired accuracy of identification.

9. In a stereoplotter including means for forming a stereo model over a plane surface from a pair of stereo pictures, in combination: means for converting each stereo picture from a space picture to an electrical picture; means for scanning said electrical pictures to produce two electrical signals which are functions of time; signal correlator means for performing the mathematical process of correlation, said correlator means being adapted to receive and correlate said electrical signals; and means for regulating said scanning means to produce a maximum correlation condition.

References Cited in the file of this patent

UNITED STATES PATENTS

| | | |
|---|---|---|
| 2,066,715 | Centeno | Jan. 5, 1937 |
| 2,251,828 | Hammond | Aug. 5, 1941 |
| 2,283,226 | Porter | May 19, 1942 |
| 2,386,816 | Scholz | Oct. 16, 1945 |
| 2,493,543 | Merchant | Jan. 30, 1950 |
| 2,679,636 | Hillyer | May 25, 1954 |
| 2,764,698 | Knight | Sept. 25, 1956 |
| 2,787,188 | Berger | Apr. 2, 1957 |
| 2,896,501 | Stamps | July 28, 1959 |